Figure 1:
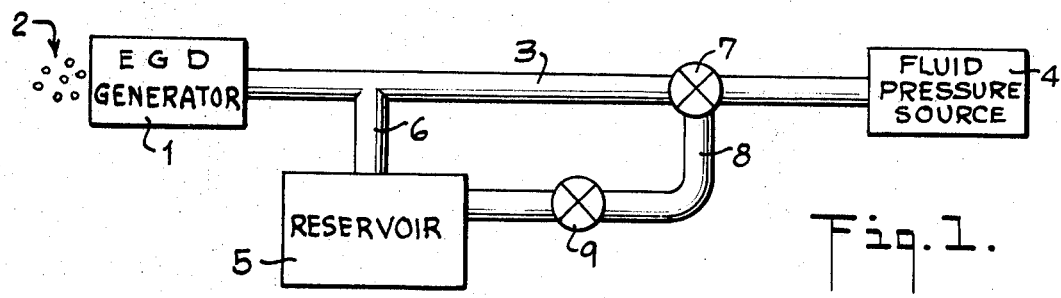
Figure 2:
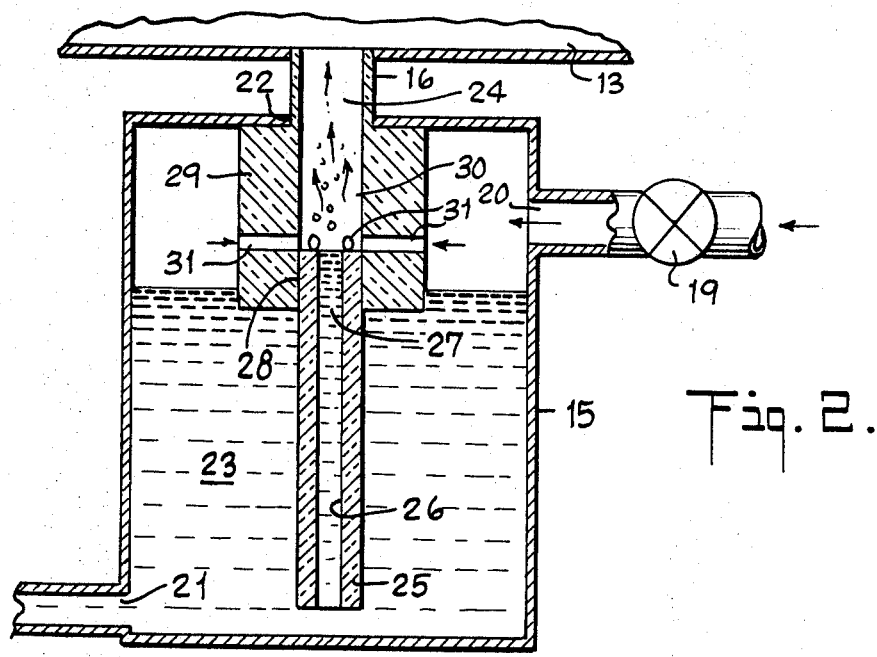

United States Patent

[11] 3,581,991

| [72] | Inventor | Donald H. Porter |
| | | Carlstadt, N.J. |
| [21] | Appl. No. | 803,927 |
| [22] | Filed | Mar. 3, 1969 |
| [45] | Patented | June 1, 1971 |
| [73] | Assignee | Gourdine Systems, Inc. |
| | | Essex, N.J. |

[54] ASPIRATOR SYSTEM
4 Claims, 3 Drawing Figs.

[52] U.S. Cl................................................ 239/15,
   239/351, 239/369
[51] Int. Cl................................................ B05b 5/00,
   F23d 11/28
[50] Field of Search........................................ 239/15,
   351, 369; 310/10

[56] References Cited
UNITED STATES PATENTS

| 3,212,211 | 10/1965 | Bennett............... | 239/15 |
| 3,263,127 | 7/1966 | Point et al............ | 239/15X |
| 2,029,141 | 1/1936 | Warner............... | 239/351X |
| 2,528,927 | 11/1950 | Vose................. | 239/351 |
| 3,508,085 | 4/1970 | Roseiszewski......... | 310/10 |

Primary Examiner—Lloyd L. King
Attorneys—Robert S. Dunham, P. E. Henninger, Lester W. Clark, Gerald W. Griffin, Thomas F. Moran, Howard J. Churchill, R. Bradlee Boal, Thomas P. Dowd and Christopher C. Dunham ABSTRACT: An aspirator system particularly for use with an electrogasdynamic generator wherein a fine aerosol is regulatably produced using a dual atomizing of the seeding medium. The seeding medium, which is contained in a suitable reservoir, is passed through a chamber prior to introduction into the main aerating fluid stream, and is preatomized in the chamber by a secondary fluid flow which may be tapped from the main aerating fluid stream. The secondary fluid enters the seeding medium reservoir to contribute to the pressure head causing medium flow and is introduced in the chamber in the form of a series of jets through holes in the chamber wall to preatomize the seeding medium therein. Control of the pressure and rate of secondary fluid flow permits fine control of the amount of seeding medium introduced into the main aerating flow and the degree of atomization achieved by the entire system.

PATENTED JUN 1 1971

3,581,991

INVENTOR.
DONALD H. PORTER
BY Lester W. Clark
ATTORNEY

ASPIRATOR SYSTEM

BACKGROUND OF THE INVENTION

The present invention relates to an aspirator system and more particularly to means for controllably producing an aerosol for use as a driving fluid in an electrogasdynamic generator.

In the growing field of electrogasdynamics, a persistent problem has been the production of a driving fluid whose degree of atomization is readily controllable. In electrogasdynamic generators, a suitable seeded fluid or aerosol is driven in a stream through an annular electrode having an axially disposed needle electrode. A high voltage is placed across the electrodes which causes a corona effect that highly ionizes the atoms of the seeding medium passing therebetween. The highly ionized atoms may then be carried by the stream against a potential gradient to produce an output voltage or the ionized cloud of atoms may be used in myriad other applications as, for example, in connection with a high voltage generator for an airless paint spray gun which is more fully disclosed in my copending U.S. application, Ser. No. 436,892, filed Mar. 3, 1965, now Pat. No. 3,519,855 and assigned to the same assignee as the present invention.

In constructing such a generator the degree of atomization of the seeding medium must be varied to achieve a suitable working level which will avoid arcing between the electrodes and similar contamination of the device. The known aspirator systems for atomizing the seeding medium do not provide a sufficient degree of atomization control to permit their use with a wide range of generators.

The present invention is intended to provide an aspirator system with a fine degree of atomization control to permit its versatile use in the electrogasdynamic field.

SUMMARY OF THE INVENTION

The aspirator of the present invention comprises a reservoir which contains a seeding medium and communicates with a flow channel through which a stream of aerating fluid is driven to produce a suction tending to draw the seeding medium into the flow where it is carried along and atomized by the flow turbulence. A secondary aerating flow, which may be tapped from the main aerating flow stream, is applied to the seeding medium reservoir to add to the pressure head therein and is introduced into a chamber through which the seeding medium passes on its way to the flow channel through holes in the chamber wall to atomize the seeding medium prior to entering the main flow channel. By controlling the pressure and rate of the secondary flow, the amount of seeding medium and its degree of atomization upon exiting from the main flow channel may be correspondingly controlled.

The present aspirator, therefore, can be used to produce a very fine aerosol, desirable for use with electrogasdynamic generators, by virtue of its dual atomization feature and also is adaptable for use with a wide variety of seeding media and aerating fluids in view of the fine control which can be achieved.

BRIEF DESCRIPTION OF THE DRAWINGS

FIG. 1 is a diagrammatic representation of an electrogasdynamic generator in combination with the aspirator system of the present invention;

FIG. 2 is a detailed sectional view of a seeding medium reservoir and atomizing chamber in accordance with the present invention; and FIG. 3 is a detailed sectional view of an alternate embodiment of a seeding fluid reservoir and atomizing chamber in accordance with the present invention.

DETAILED DESCRIPTION OF THE DRAWINGS

FIG. 1 shows an electrogasdynamic generator 1 utilizing the aspirator system of the present invention to supply a driving fluid. The driving fluid usually in the form of an aerosol is fed to the electrogasdynamic generator and ionized therein by a corona discharge resulting in the production of a cloud 2 of highly charged particles. The charged cloud 2 can be used in various applications such as, for example, in an airless paint spray gun. The electrogasdynamic generator 1 which is shown may be of the type disclosed in my previously mentioned copending U.S. application, Ser. No. 436,892.

The aerosol for use in such generators is created by drawing a seeding medium into a stream of aerating fluid wherein the seeding medium is atomized by the flow turbulence of the fluid. As shown in FIG. 1, the aerating fluid is supplied to the electrogasdynamic generator 1 through flow channel 3 from a source of fluid pressure 4. A reservoir 5 containing the seeding medium is communicated with the flow channel 3 through a similar flow passage 6. At the point where the seeding medium passage 6 communicates with the flow channel 3, a suction is created by the aerated fluid stream drawing the seeding medium into the flow. The aerating fluid flow is controlled by a suitable valve 7 disposed in the flow channel 3 and the amount of seeding medium flow and the degree of atomization may be controlled to a degree by this valve 7. However, the degree of control is extremely limited in many respects and particularly when attempting to achieve small decrements of change in the flow with very fine aerosols.

To provide the desired fine control, a secondary aerating flow, which may be supplied by a separate source but which is preferably tapped off the main flow stream, is conducted through conduit 8 to the seeding medium reservoir 5. The amount of secondary flow tapped off may be regulated by the valve 7 and an additional fine control valve 9 may be provided in the conduit 8.

The operation of this secondary flow is best understood with reference to FIG. 2. The seeding medium reservoir is shown in the form of a container 15 having a port 20 for the introduction of the secondary flow, a port 21 for the introduction of seeding medium, and a port 22 for the withdrawal of the seeding medium into passage 24 of conduit 16 which communicates with the main flow channel 13. For the purposes of our description, water will be used as the seeding medium and air as the aerating fluid, but it should be understood that many other media are suitable for such use and will be indicated hereinafter.

Water 23 is introduced into the container 15 through the port 21 under a pressure head which will maintain it at a desired level such as, for example, that depicted in the figure. A tube 25 having a small central bore 26 therein is immersed in the water 23 and forms part of the flow passage 24 to the main flow channel 13. A column 27 of water will rise in the tube 25 under the influence of the pressure head and perhaps further by capillary action if the dimensions of the bore 26 are sufficient to cause such action. The upper end of the tube 25 is fitted and held in a bore 28, in a member, such as a plastic block 29, which defines a chamber 30 above the upper end of the tube 25. The chamber 30 communicates by means of the passage 24 in conduit 16 with the main flow channel 13. The flow of the aerating fluid, air in this case, in the channel 13 produces an aspirating effect on the upper end of the passage 24 causing a decreased pressure or suction in the chamber 30. This suction effect also helps to lift the column 27 of water in the tube 25. In prior devices, this suction effects lifts the water column 27 up into the main flow channel 13 where it is entrained and atomized by the turbulent air flow passing therealong. It will be seen that with such devices, the ability to control the amount of water flow and atomization is limited to the gross regulation of the speed and turbulence of the air flow in the channel 13.

In the arrangement of the present invention, a secondary flow whose rate and pressure may be closely regulated by a control valve 19, or valves, is introduced through port 20 into the chamber 30 above the level of the water 23. The pressure of this secondary flow thus contributes to the pressure head on the water 23 in the reservoir 15 and will assist in lifting the water column 27 within the tube 25 in accordance with the magnitude of such pressure. The amount of water then being fed to the chamber 30 and ultimately to the flow channel 13 may be regulated in accordance with the pressure level of the secondary flow.

The secondary flow may also be used to control the degree of atomization of the water by providing a series of small bores or holes 31 in the plastic body 29 to permit the secondary air to enter the chamber 30. These holes 31 are preferably located at the upper end of the tube 25 so that the water as it passes out of the tube 25 is entrained by the secondary air passing through the holes 31. The holes 31 create a series of jets of secondary air which create a turbulent flow in the chamber 30 entraining and atomizing the upper end of the water column 27. Thus the water 23 as it is drawn toward the main flow channel 13 is initially atomized in the chamber 30 and then further atomized upon entering the air flow in the main channel 13. The ultimate degree of atomization of the water downstream in the main flow channel 13 may thus be regulated by controlling the degree of initial atomization by the secondary air jets in the chamber 30. The rate of air flow in the atomizing jets in the chamber 30 is ultimately controlled by the secondary flow control valve 19 which therefore can be used to regulate both the amount and degree of atomization of the water flow.

The number and size of the holes 31 will determine the operating limits of water flow and atomization which can be achieved by any particular aspirating device. For example, aspirators in accordance with the present invention have been constructed using six holes equally spaced along the walls of the vaporizing chamber and having bore diameters ranging from 0.076 inch to 0.1150 inch. They have been found to provide atomization of the aerosol satisfactory for use with conventional gun-type electrogasdynamic generators when using a secondary flow ranging in pressure from 40 to 90p.s.i.

Gases, in addition to air, which have been found suitable as aerating fluids, include hydrogen, helium, nitrogen, argon, freon, and nitric oxide. In addition to water, the seeding medium may consist of alcohol, ketone, glycerol, sulfuric acid and similar liquids and certain fine powders and particulate matter.

Figure 3:
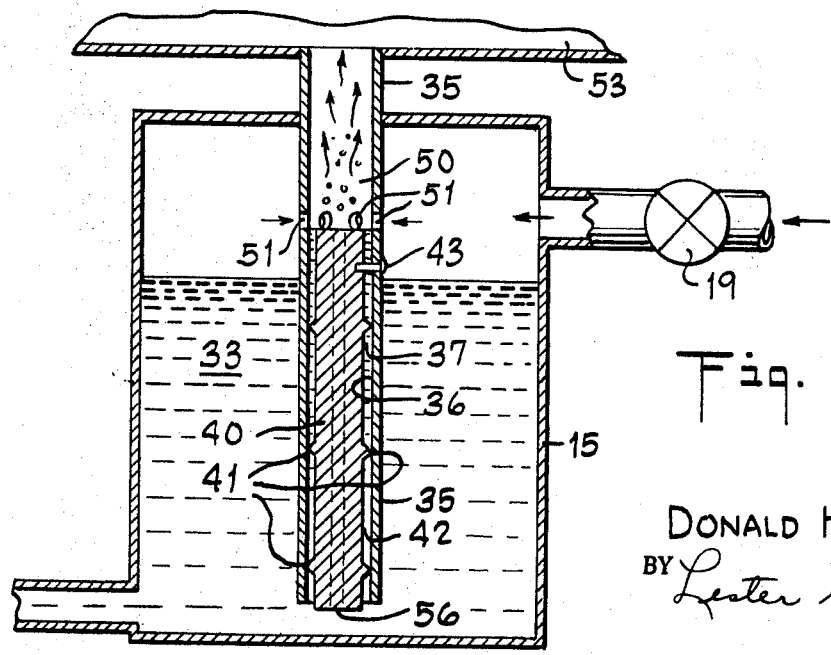

An alternate embodiment incorporating the present invention is shown in FIG. 3. Here the seeding medium conducting passage comprises a single tube 35 having a comparatively larger bore 36 in which a suitable rod member 40 is concentrically disposed. A series of small protuberances 41 are provided on the surface of the rod 40 to properly center it in the bore 36 permitting the water 33 to rise in the annular space 42 between the rod 40 and the wall of the bore 36. A suitable means such as locking pin 43 is used for maintaining the rod 40 axially within the tube 35.

In this embodiment, the upper end of the rod 40 defines the floor of the atomizing chamber 50 and the secondary air is introduced through holes 51 bored in the tube 35 at the level of the upper end of the rod 40.

Here the water column 37 in the general form of an annulus rises in the space 42 between the tube 35 and the rod 40 again under the influence of the pressure head, the secondary flow pressure, the main flow channel aspirating effect and any capillary action due to the dimensions of the space and the qualities of the seeding medium. Upon reaching the top of the rod 40, the water is entrained and atomized by the secondary air which has been formed into jets by the series of holes 51 in the tube 35. The atomized water is then drawn up through the remainder of the tube 35 and into the main flow channel 53 for further atomization and use in an electrogasdynamic generator.

In this embodiment, the space 42 or gap between the tube 35 and the rod 40 may be of the order of 0.005 inch. In view of the close tolerances which are used in this and the former embodiment, it is preferable to use nonmetallic materials in the construction of the various components to avoid electrolytic effects and other factors which might cause contaminants to enter the seeding medium and obstruct proper flow within the tubes. In the event that increased seeding medium flow might be desired in the latter embodiment, both embodiments can be somewhat combined by providing a bore 56 in the rod 40 as shown in dotted lines in FIG. 3.

An improved aspirating system is thus provided particularly suitable for use with electrogasdynamic generators which is comparatively simple in construction and operation, while providing a fine control of the amount and atomization of the resulting aerosol.

I claim:

1. A system for producing a cloud of highly charged particles from an aerosol comprising the combination of:
    a. an electrogasdynamic generator for placing a charge on the particles of the aerosol;
    b. means for providing a fluid stream for producing and supplying the aerosol to said electrogasdynamic generator;
    c. a flow channel for conducting said fluid stream to said electrogasdynamic generator;
    d. means defining a reservoir for containing a source of seeding material and in communication with said flow channel for supplying seeding material to be atomized by said fluid stream to produce the aerosol;
    e. a passage for conducting the seeding material between said reservoir and said flow channel;
    f. means for creating turbulence in said passage to atomize said seeding material passing therethrough;
    g. means for communicating fluid under pressure with said turbulence means and with said reservoir to contribute to the pressure head therein; and
    h. means for controlling the pressure of said fluid to regulate the amount and degree of atomization of said seeding medium supplied to said flow channel.

2. A system as claimed in claim 1 wherein the means for providing said fluid stream also provides said fluid under pressure.

3. A system as claimed in claim 1 wherein the means for creating turbulence comprises an opening in the wall of said passage located at the level at which the seeding material enters said passage and forming a jet of fluid from said fluid under pressure.

4. A system as claimed in claim 1 including means for varying the pressure of said fluid stream to control the amount of flow and degree of atomization of said seeding material.